March 6, 1934.  E. E. JOHNSON  1,949,608
SAFETY HOOK
Filed July 17, 1931
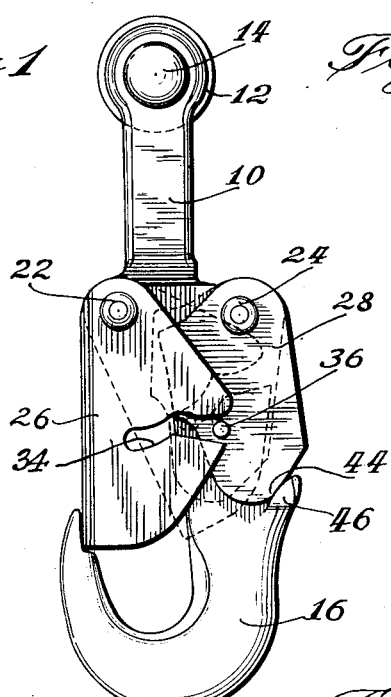
Fig. 1
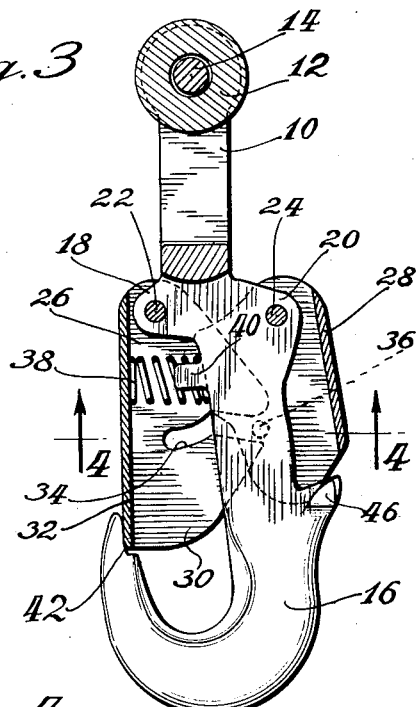
Fig. 3
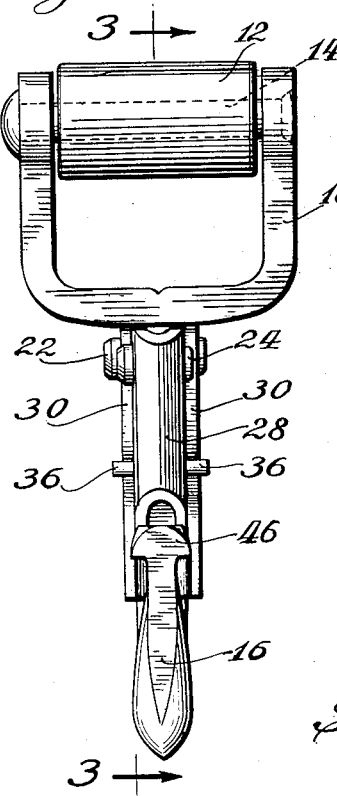
Fig. 2
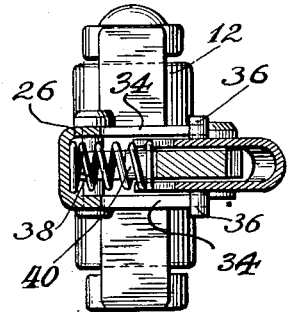
Fig. 4
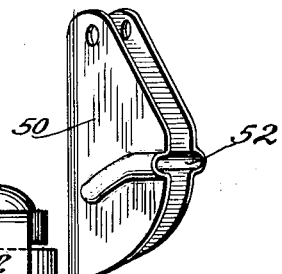
Fig. 5
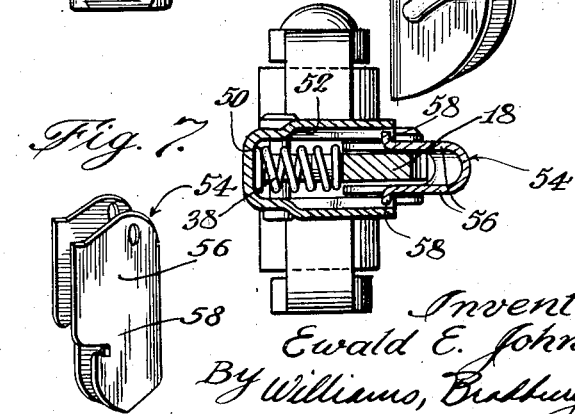
Fig. 7
Fig. 6
Inventor:
Ewald E. Johnson
By Williams, Bradbury,
McCaleb & Hinkle
Attys Patented Mar. 6, 1934

1,949,608

UNITED STATES PATENT OFFICE 1,949,608

SAFETY HOOK

Ewald E. Johnson, St. Charles, Ill., assignor to Mathias Klein & Sons, Chicago, Ill., a corporation of Illinois Application July 17, 1931, Serial No. 551,530

14 Claims. (Cl. 24—241)

My invention relates generally to safety hooks and more particularly to improvements in hooks of this type as used for linemen's belts and safety straps, window washers' belts, and similar articles.

It is an object of my invention to provide a hook having a latch which is securely locked in position to prevent accidental disengagement of the hook but which may be very easily manually disengaged.

A further object is to provide an approved safety hook in which the operating spring is enclosed and is operative to actuate both the hook latch and the lock for the latter.

A further object is to provide an improved safety hook which may be constructed of a small number of parts, easily manufactured and assembled, which will be durable, of pleasing appearance, and which may be economically manufactured.

Other objects will appear from the following description, reference being had to the accompanying drawing, in which:

Fig. 1 is a front elevation of the hook;

Fig. 2 is a side elevation thereof;

Fig. 3 is a longitudinal sectional view thereof taken on the line 3—3 of Fig. 2;

Fig. 4 is a transverse sectional view taken on the line 4—4 of Fig. 3;

Fig. 5 is a modified form of latch; and

Fig. 6 is a modified form of latch lock adapted for use in conjunction with the latch of Fig. 5.

Fig. 7 is a sectional view similar to Fig. 4 but showing the hook equipped with the modified form of latch and lock illustrated in Figs. 5 and 6.

The hook of my invention comprises the usual clevis shank 10 having a roller 12 supported on a pin 14 which is riveted to the clevis. The hook portion 16 is preferably formed integrally with the clevis shank, the parts being usually made of a single forging. The midportion of the shank 10 is flattened and has sidewardly protruding extensions 18 and 20 which are transversely drilled to receive rivets 22 and 24, the latter serving as pivotal supports for a latch 26 and a latch lock 28 respectively.

The latch 26 is substantially U-shaped in transverse cross section as indicated in Fig. 4 having two similarly shaped side plates 30 joined by the connecting portion 32. Each of the side plates 30 of the latch has an irregular slot 34 formed therein. The latch lock 28 is likewise substantially U-shaped in transverse cross section but is of lesser width than the latch 26 so as to be capable of telescoping movement within the latter. A pair of short pins 36 are riveted to the sides of the latch lock 28, projecting outwardly therefrom so as normally to lie at the open ends of the slots 34 in the latch 26.

A compression coil spring 38 is held in position by a lug 40 formed on the shank of the hook and is adapted to force the latch 26 outwardly so that its lower extremity will be held firmly against the tip of the hook 16, fitting in a suitably shaped recess 42 formed in the latter. The diameter of the spring 38 is greater than the width of the shank of the hook as shown in Fig. 4 so that the latch lock 28 is held in its outermost position with its lower end portions 44 engaging suitable lugs 46 formed on the hook 16.

In using the safety hook of my invention it is necessary manually to move the latch from the position in which it obstructs the throat of the hook and to do this it is necessary first or simultaneously to move the lock 28 inwardly. It is impossible to snap the hook over a ring or similar attachment, for the latch 26 will be locked it its normal position as shown in Fig. 1 because of the engagement of the walls of the slots 34 with the pin 36. It is therefore necessary, in order properly to engage the hook with an attachment, to press against the back of the lock 28 so as to swing the pins 36 inwardly and simultaneously or thereafter press inwardly on the latch 26. This operation may easily be performed by grasping the hook in such a manner that the latch and lock may be simultaneously depressed by the thumb and forefinger. After the lock has moved inwardly to the limit of its inward movement (when its back abuts against the edge of the shank portion of the hook) its pins 36 lie at the elbow of the slots 34 and thus permit inward swinging movement of the latch 26. Upon releasing manual inwardly directed pressure on the latch and lock the spring 38 will force these two members outwardly from the dotted line position of Fig. 1 to the full line position. Thereafter no amount of manipulation of the hook with respect to the member to which it is attached will be effective to swing the latch 26 inwardly since it is locked against such inward movement by the pins 36 and the pins 36 are held in locking position by the compression spring 38.

In Figs. 5, 6 and 7 I have illustrated modified forms of latches and lock members respectively. The latch 50 of Fig. 5 is generally similar to the latch 26 except that instead of having open slots provided in its sides, channels 52 of substantially the same confirmation as the slots 34 are provided by being pressed outwardly from the sides of the latch. The lock member 54 shown in Fig. 6 is likewise similar to the previously described locking member 28 except that in place of the pins 36 a pair of ears 58 are struck outwardly from the side walls 56 of the lock. These ears are adapted to cooperate with the channel formed grooves 52 of the latch 50 in substantially the same manner as the pins 36 cooperate with the slots 34 in the previously described embodiment. The modified forms of latch and lock shown in Figs. 5 and 6 have the advantage that the ears 58 are entirely concealed and the possibility of accidental engagement of these ears thereby accidentally unlocking the latch is eliminated. Furthermore, this modified construction may be more economically manufactured.

Having thus described my invention what I claim as new and desire to protect by Letters Patent is:

1. A safety hook comprising a hook member having a shank, a latch and a lock comprising a pair of members pivoted to said shank, said members being telescopic with respect to each other and with respect to said shank, and a single spring for simultaneously urging said latch into position to close the throat of said hook and holding said lock in locking position.

2. A safety hook comprising a hook member having a shank, a latch and a lock comprising a pair of members pivoted to said shank, said members being telescopic with respect to each other and having interengaging pins and slots, and a single spring for urging said latch into position to close the throat of said hook and at the same time holding said lock in locking position.

3. A safety hook comprising a hook member having a shank, a latch and a lock comprising a pair of members pivoted to said shank, said members being telescopic with respect to each other and with respect to said shank, and a single compression coil spring for urging said latch into position to close the throat of said hook and at the same time holding said lock in locking position, said spring having its ends engaged by said latch and lock members respectively.

4. In a safety hook the combination of a hook having a shank, a latch pivotally mounted on said shank so as to be capable of closing the throat of the hook, said latch having two pairs of locking surfaces, a lock pivoted to said shank and having a pair of elements thereon engageable between each of said pairs of locking surfaces, and a spring for urging said lock to a position where said elements will be engaged by said locking surfaces and thereby prevent said latch from swinging inwardly to uncover the throat of said hook.

5. In a safety hook the combination of a hook having a shank, a latch pivotally mounted on said shank so as to be capable of closing the throat of the hook, said latch having a pair of slots therein, a lock pivoted to said shank and having a pair of elements thereon one engageable in each of said slots, and a spring for urging said lock to a position where said elements will be in a position to be engaged by the walls of said slots and thereby prevent said latch from swinging inwardly to uncover the throat of said hook.

6. In a safety hook the combination of a hook having a shank, a latch pivotally mounted on said shank so as to be capable of closing the throat of the hook, said latch having a locking slot, a lock pivoted to said shank and having a lug thereon engageable in said slot, and a spring for holding said lock in a position where said lug will be engaged by the walls of said slot, thereby to prevent said latch from swinging inwardly to uncover the throat of said hook.

7. In a safety hook, the combination of a hook member having a shank and a hook portion, a pair of elements pivoted to said shank and formed to telescope thereover and relative to each other, a spring for moving said elements apart, said spring having one end supported by said shank and being operable to hold said telescoping elements apart, and interengaging means on said telescoping elements to prevent movement of one prior to movement of the other.

8. In a safety hook, the combination of a hook member having a shank and a hook portion, a pair of telescoping elements pivoted to said shank, a spring for moving said elements apart, said spring having one end loosely supported by said shank and being operable to hold said telescoping elements apart by direct engagement of its ends with said elements respectively, and interengaging means on said telescoping elements to prevent movement of said latch prior to movement of said lock.

9. In a safety hook, the combination of a hook member having a shank and a hook portion, a pair of telescoping elements pivoted to said shank, a spring for moving said elements apart, said spring having one end supported by said shank and being operable to hold said telescoping elements apart, and interengaging pin and slot means on said telescoping elements to prevent movement of said latch prior to movement of said lock.

10. A latch and latch lock for a safety hook comprising a pair of pivoted members telescopically engageable with respect to each other, one of said members constituting a latch member and the other of said members constituting a locking member therefor, a spring positioned within said members for urging said latch member into engagement with the throat of a hook, and lugs carried by said locking member engageable with slots in said latch member to prevent movement of one member prior to movement of the other.

11. In a safety hook, the combination of a shank and a hook depending therefrom, a safety latch for said hook comprising a telescopic latch member, a latch lock comprising a bifurcated member pivoted to said shank, a spring positioned on said shank between said members for urging the same outwardly, said latch member being telescopically engageable with said bifurcated lock member, and guideways in said latch member cooperable with lugs on said lock member for holding said latch in closed position and preventing movement of one member prior to movement of the other.

12. In a safety hook, a hook member having a shank and a curved bill at one end thereof, a latch pivoted to said shank and adapted to engage said bill, said latch having a pair of cheeks straddling said shank, a locking element pivoted to said shank and having means for engaging said latch to lock the latter in substantial engagement with said bill, said locking element telescoping over said shank, and a spring operable to move said locking element to locking position.

13. In a safety hook, a hook member having a shank and a curved bill, a latch pivoted to said shank and adapted to engage said bill and having a pair of side cheeks straddling said shank, a locking element having a thumb piece and a pair of forwardly extending arms having means for engaging portions of said latch to lock the latter in position in substantial engagement with said bill, means for pivotally connecting said locking element to said shank, and means operable resiliently to hold said locking element in locking position and resiliently to hold said latch in substantial engagement with said bill.

14. In a safety hook, a hook member having a shank with a curved bill at one end thereof, a latch pivoted to said shank and adapted to engage said bill, said latch having a pair of slotted cheeks straddling said shank, and means to lock said latch in substantial engagement with said bill, said means including a pin normally projecting through the slot in one of said cheeks, and resilient means to hold said pin in locking position.

EWALD E. JOHNSON.